Nov. 24, 1970   R. F. SEXAUER   3,541,721
COLLAPSIBLE LOBSTER TRAP
Filed June 2, 1969   2 Sheets-Sheet 1

INVENTOR
Richard F. Sexauer
BY
ATTORNEYS

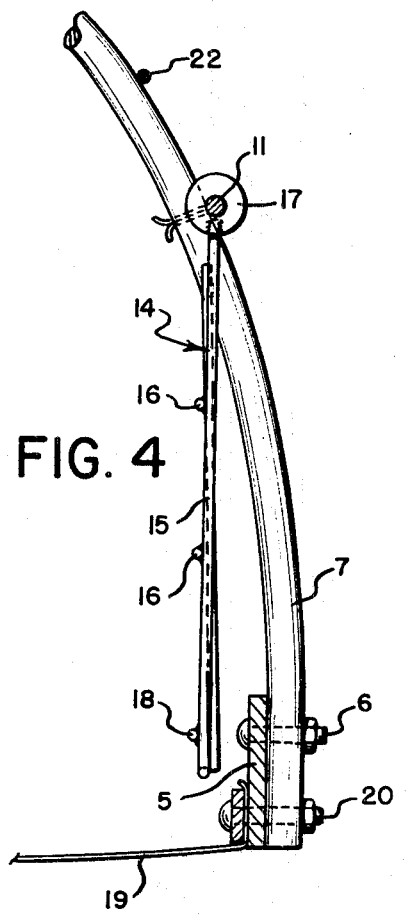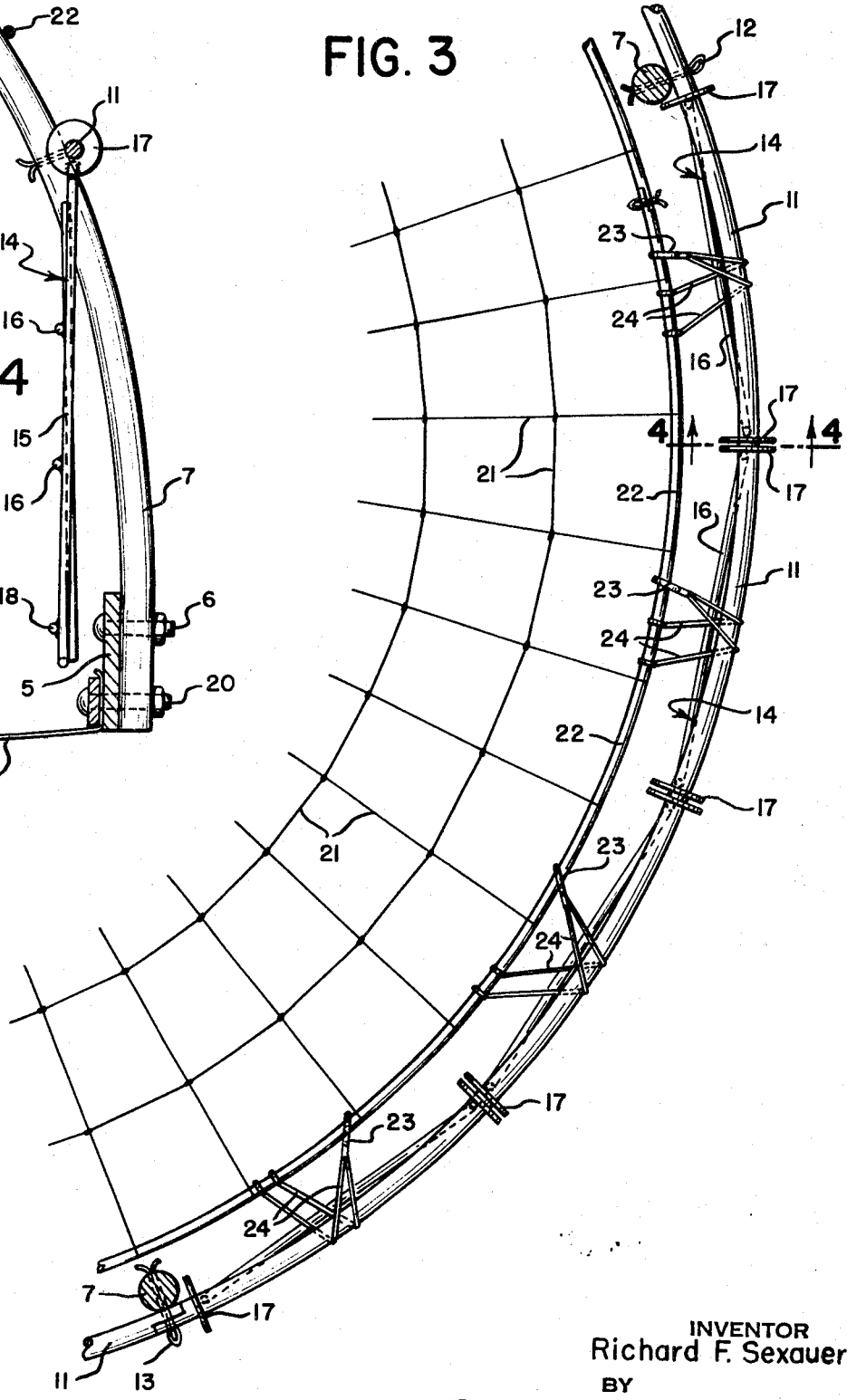

United States Patent Office 3,541,721
Patented Nov. 24, 1970

3,541,721
COLLAPSIBLE LOBSTER TRAP
Richard F. Sexauer, 140 Munsey Place,
Manhasset, N.Y. 11030
Filed June 2, 1969, Ser. No. 829,362
Int. Cl. A01k *69/08;* A01m *23/08*
U.S. Cl. 43—66                         1 Claim

ABSTRACT OF THE DISCLOSURE

A collapsible lobster or fish trap comprising a base ring, semi-circular upright frames crossing one another at the top and secured at their lower ends to the base ring, a gate-support pivot ring resting on the frames with gates hung on this ring, a closure for the base ring plane and a dome-like cover positioned over the top of the frames and extending downwardly to the pivot ring. All rings, frames and the dome-like cover are removably secured together so that the trap can be readily disassembled.

---

This invention relates to lobster traps and the like and, more particularly, to a lobster trap that is readily collapsible to a flat-packed form.

Lobster traps are necessarily bulky and pose a storage problem when they are not being used. Although collapsible traps have been proposed heretofore, they have tended to be complicated to assemble.

I have now developed a collapsible lobster trap which is composed of only a few separate parts each of which can be stored or packed flat yet can be assembled in a matter of minutes without any tools. The trap of my invention comprises a base ring, two semi-circular upright cage frames the ends of which are removably secured to the base ring and the centers of which are removably secured together above the plane of the base ring, and a pivot bar ring having a diameter less than that of the base ring and resting on the cage frames in a plane substantially parallel to and spaced above that of the base ring. A plurality of vertical foraminous gates are pivotally hung side-by-side on the pivot ring and depend therefrom substantially to the inside of the base ring. A base wall is secured to the base ring, and a dome-like foraminous cover wall is positioned over the cage frames and is removably secured to the pivot ring.

These and other novel features of the lobster trap of the invention will be readily understood from the following description taken in conjunction with the accompanying drawings in which FIG. 1 is a front elevation of the lobster trap;

FIG. 3 is an enlarged partial plan detail of the gate assembly on its pivot ring; and FIG. 4 is a side section taken along line 4—4 in FIG. 3.

Figure 1:
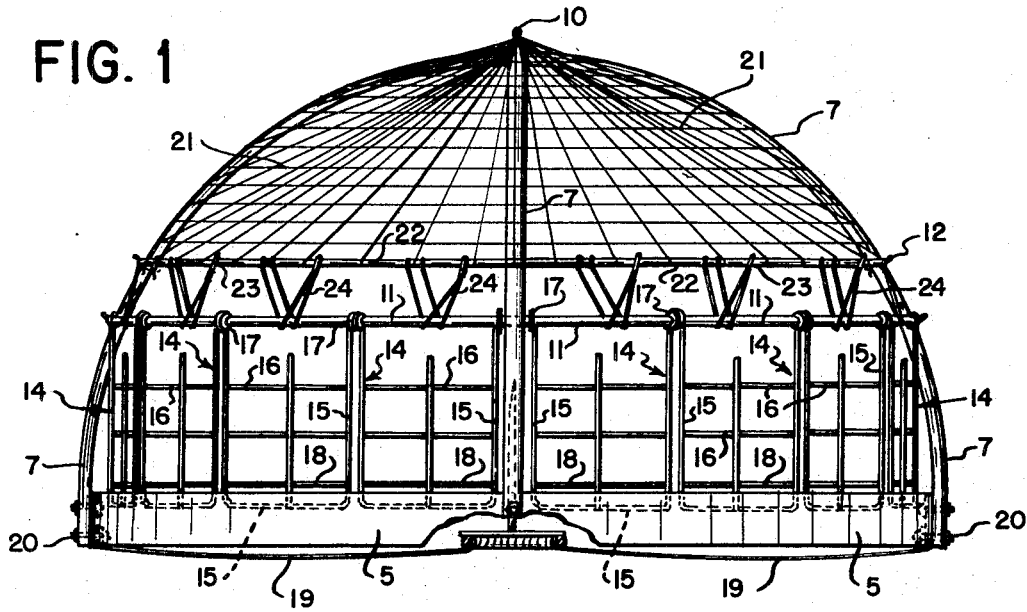
Figure 2:
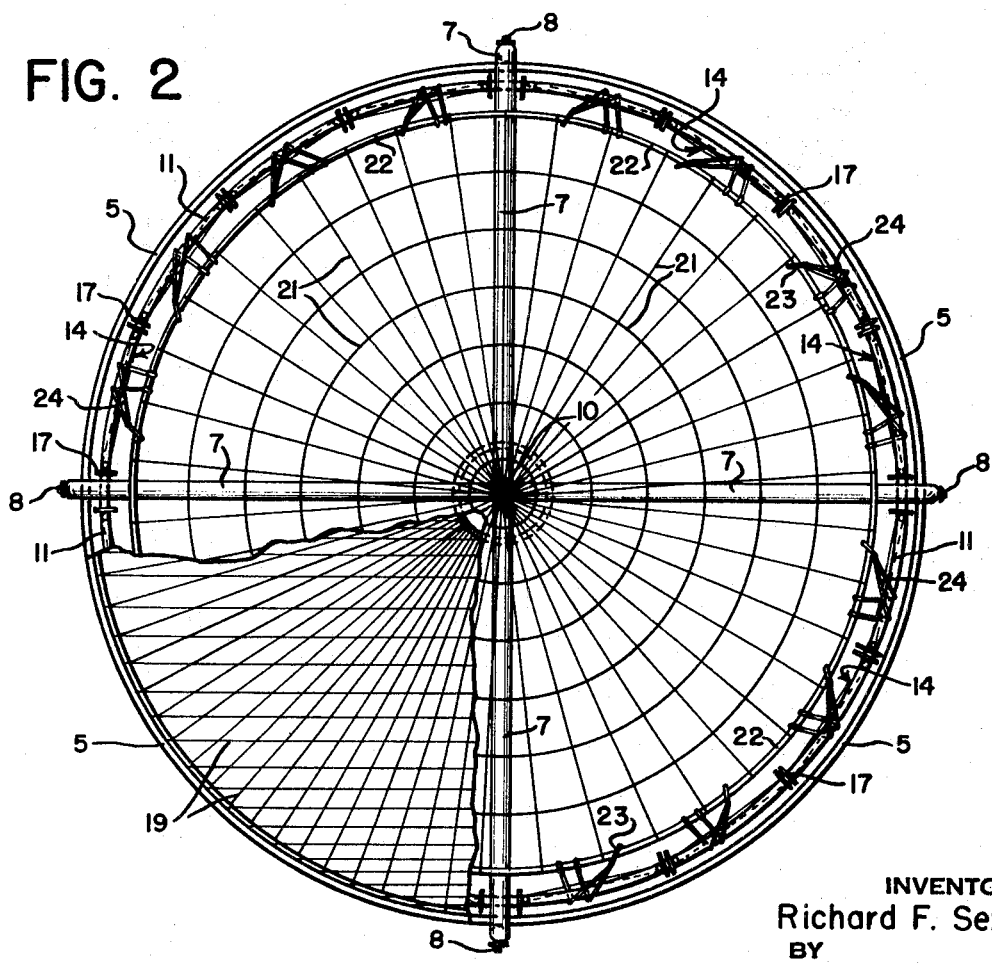
FIG. 2 is a top plan of the trap shown in FIG. 1, partly broken away to show the bottom netting.

As shown in the drawings, the collapsible trap of the invention is provided with a base ring 5, advantageously of flat strip material formed or formable into a ring. The ends of the base ring are provided with any suitable securing means such, for example, as holes through which a connecting bolt 6 (or cotter pins or the like) can be mounted to hold the ends of the ring together. The trap is provided with a semi-spherical shape by two or more semi-circular upright cage frames 7 secured to the base ring. The cage frames are mounted with their ends secured by bolts 8 (or cotter pins or the like) to the base ring 5 and with their centers overlapping at the top of the cage where they are secured by a cotter pin 10 or the like. The cage framing is completed by a pivot ring 11 resting on the upright cage frames 7 and secured thereto by cotter pins 12 or the like. The pivot ring 11 can be a completed ring or it can be secured in ring form by any appropriate means such as a bolt 13 (or clamp or cotter pin, or the like). By making the pivot ring of somewhat smaller diameter than the base ring, the pivot ring will rest upon the cage frames 7 in a plane parallel to but spaced above the plane of the base ring.

The pivot ring 11 serves to support trap entrance gates 14 mounted around the lateral circumference of the trap. Each gate is formed of a frame 15 and crossbars 16 so that it is foraminous, and the upper end of each gate is provided with a washer 17 welded or soldered to the top of the frame members so that the hole in the washer permits the pivot ring 11 to be threaded therethrough. When the pivot ring is provided in completed ring form, the upper ends of the gate frames are advantageously provided with spring clips or the like, in lieu of the washer 17, adapted to hang on the pivot ring. Thus, the gates 14 are arranged side-by-side on the pivot ring and hang downwardly toward but on the inside of the base ring 5 so that they will open inwardly only. If desired, the base of each gate can be provided with a weighting bar 18.

The series of adjacent gates 14 provide a closure of the trap between the pivot ring 11 and the base ring 5. The plane of the base ring is closed by foraminous material 19, such as netting, screen or pierced sheet material, clamped advantageously to the base ring 5 by bolts 20, or cotter pins or the like. The top of the trap is also closed by a foraminous web 21 of netting, screen, pierced sheet, or the like, secured to a circular frame 22 adapted to rest upon the cage frames 7 just above the pivot ring 11 and secured thereto by any suitable quick-assembly means such as hooks 23 and rubber bands 24 as shown in FIG. 3. The center of the resulting trap can be provided, if desired, with a bait hook secured to or mounted on the base ring closure material 19 or suspended from the top intersection of the cage frames 7.

The frame and ring members of the trap can be made of metal or of plastic, and the netting or webbing portions can be made of tarred cotton string, plastic, wire, or the like. All parts, including these and the connecting devices such as bolts and cotter pins, are made of materials which will not corrode in water.

It will be readily appreciated, accordingly, that the trap of this invention can be sold and shipped in the flat packed disassembled state, that it can be quickly and simply assembled without special tools, and that it can be just as easily disassembled for storage.

I claim:

1. A collapsible lobster trap comprising a base ring, two semi-circular upright cage frames the ends of which are removably secured to the base ring and the centers of which are removably secured together above the plane of the base ring, a pivot bar ring having a diameter less than that of the base ring and resting on the cage frames in a plane substantially parallel to and spaced above that of the base ring, a plurality of vertical foraminous gates pivotally hung side-by-side on the pivot ring and extending downwardly substantially to the inside of the base ring, a base wall secured to the base ring, and a dome-like foraminous cover wall positioned over the cage frames and removably secured to the pivot ring.

References Cited

UNITED STATES PATENTS

| 2,741,063 | 4/1956 | McCallum | 43—66 |
| 2,760,297 | 8/1956 | Buyken | 43—105 |

WARNER H. CAMP, Primary Examiner

U.S. Cl. X.R.

43—100